US011265857B1

(12) United States Patent
Alizadeh et al.

(10) Patent No.: US 11,265,857 B1
(45) Date of Patent: Mar. 1, 2022

(54) ANTENNA BEAM SWITCHING IN MULTI-ACCESS POINT COORDINATION

(71) Applicant: Cisco Technology, Inc., San Jose, CA (US)

(72) Inventors: Ardalan Alizadeh, Milpitas, CA (US); Sivadeep Reddy Kalavakuru, Akron, OH (US); Gautam D. Bhanage, Milpitas, CA (US); John Matthew Swartz, Lithia, FL (US); Matthew Aaron Silverman, Shaker Heights, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/145,226

(22) Filed: Jan. 8, 2021

(51) Int. Cl.
*H04W 72/04* (2009.01)
*H04B 7/06* (2006.01)
*H04L 43/0829* (2022.01)
*H04B 17/318* (2015.01)

(52) U.S. Cl.
CPC ...... *H04W 72/0413* (2013.01); *H04B 7/0617* (2013.01); *H04B 7/0695* (2013.01); *H04B 17/318* (2015.01); *H04L 43/0841* (2013.01)

(58) Field of Classification Search
CPC ..... H04W 88/08; H04W 88/10; H04W 88/12; H04B 7/0691; H04B 7/0695
See application file for complete search history.

(56) References Cited

U.S. PATENT DOCUMENTS

| 2005/0255892 | A1* | 11/2005 | Wong | H04B 7/2606 |
| | | | | 455/562.1 |
| 2006/0238400 | A1 | 10/2006 | Brennan et al. | |
| 2016/0014626 | A1 | 1/2016 | Yi et al. | |
| 2019/0165843 | A1 | 5/2019 | Shang et al. | |
| 2020/0374870 | A1* | 11/2020 | Guo | H04W 28/16 |

FOREIGN PATENT DOCUMENTS

WO    WO2015090353    6/2015

OTHER PUBLICATIONS

Deng, Cailian, et al., "Wi-Fi 7: New Challenges and Opportunities"; IEEE 802.11 be Aug. 3, 2020.

* cited by examiner

*Primary Examiner* — Kevin Kim
(74) *Attorney, Agent, or Firm* — Merchant & Gould P.C.

(57) ABSTRACT

Optimal determination of wireless network pathway configurations may be provided. A computing device may establish Multi-Access Point (AP) coordination between at least a first AP and a second AP. The first AP can determine an uplink operation is scheduled. When an uplink is scheduled, the first AP can switch its antenna to a narrow beamwidth. The first AP can then receive uplink transmissions from at least a client in the coverage area of the narrow beamwidth. After the uplink transmission, the first AP can then switch the antenna to a larger beamwidth for a next Multi-AP coordination operation.

19 Claims, 8 Drawing Sheets

ANTENNA BEAM SWITCHING IN MULTI-ACCESS POINT COORDINATION

TECHNICAL FIELD

The present disclosure relates generally to wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but the AP can also be an integral component of the router itself. Several nodes may also work in coordination, either through direct wired or wireless connections in a Wireless Local Area Network (WLAN). The APs, in some WLAN implementations, may work in concert in a scheme called Multi-AP Coordination. Two or more APs can coordinate some operations. However, doing joint uplink transmissions can sometimes, at least, cause interference at the APs.

BRIEF DESCRIPTION OF THE FIGURES

The accompanying drawings, which are incorporated in and constitute a part of this disclosure, illustrate various example(s) of the present disclosure. In the drawings.

DETAILED DESCRIPTION

Overview

Optimal determination of wireless network pathway configurations may be provided. A computing device may establish Multi-Access Point (AP) coordination between at least a first AP and a second AP. The first AP can determine an uplink operation is scheduled. When an uplink is scheduled, the first AP can switch its antenna to a narrow beamwidth. The first AP can then receive uplink transmissions from at least a client in the coverage area of the narrow beamwidth. After the uplink transmission, the first AP can then switch the antenna to a larger beamwidth for a next Multi-AP coordination operation.

Both the foregoing overview and the following description are examples and explanatory only, and should not be considered to restrict the disclosure's scope, as described and claimed. Furthermore, features and/or variations may be provided in addition to those described. For example, example of the disclosure may be directed to various feature combinations and sub-combinations described in the example.

EXAMPLE

The following detailed description refers to the accompanying drawings. Wherever possible, the same reference numbers are used in the drawings and the following description to refer to the same or similar elements. While example (s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

WiFi standards, e.g., 802.11ax/be, can support Orthogonal Frequency-Division Multiple Access (OFDMA) downlink, triggered-based OFDMA uplink, and spatial reuse to allow for some co-channel interference. However, it can be useful to reduce co-channel interference during these uplink/downlink events to improve AP performance. New WiFi standards may allow two or more APs to form a multi-AP system, which can have a distributed or centralized coordination. The changes to the standard(s) can allow omnidirectional antennas to perform better in cooperative scenarios when multiple neighboring APs are serving clients in the same channel. The cooperation may help support features such as roaming. The collaboration can also include partial nulling to devices in another AP's cell. This nulling may require sounding to that device(s), which can result in more overhead and may not be available at each AP.

Trigger-based multi-user uplink has not been designed for multi-AP coordination, and trigger-based multi-user uplink may not work properly in at least some coordinated scenarios. Each AP may prefer to schedule clients, in the physical vicinity of the AP, to be able to control better the time of transmissions and the power alignment of transmissions. In this uplink case, for transmitting trigger-frames concurrently at multiple APs, null steering may be required to minimize the downlink interference among the scheduled clients of the multiple APs. Unfortunately, null steering can require soundings to identify the channel of undesired clients to send null signals to those undesired clients.

Uplink (UL) Multi-User (MU) (UL MU) can use both OFDMA and MU Multiple Input Multiple Output (MIMO) (MU-MIMO) to facilitate UL MU. Both OFDMA and MU-MIMO can help provide interference-free concurrent transmissions, in a synchronous network, via frequency-division and spatial-division channel sharing among clients. This UL MU method has been introduced in 802.11ax and includes sending downlink trigger frame(s) to align the uplink concurrent transmission from the client stations. A possible requirement of High Efficiency Trigger-Based (HE-TB) UL may be the synchronization of transmissions between the Wi-Fi stations (STAs) and the AP, in terms of timing, frequency, and power. For timing, 802.11ax mandates that STAs transmit within 400 ns of each other.

First, in the Downlink (DL) direction, the AP can transmit a trigger frame providing synchronization to the STAs. This trigger frame may also contain information about the OFDMA sub-carriers Resource Unit (RU) assigned to each STA. With the uplink, the participating STAs need to start transmission of the uplink signal after a specified time interval Short Interframe Space (SIFS) of 16 µs+−400 ns, after the end of the trigger frame. The timing requirement in 802.11ax specifies that a STA who participates in UL MU shall ensure the arrival time of a transmitted frame to the AP to be within 0.4 µs of the SIFS+Round Trip Delay (RTD) from the end of Trigger frame transmission. The RTD may be the amount of time it takes for a signal to be sent plus the amount of time it takes for an acknowledgement of that signal to be received. The standard also notes that STAs are not expected to measure or compensate for their RTDs. Hence, for standard-compliant devices, concurrent UL MU frames can arrive at the AP with timing deviation of up to 0.8 µs+maximum RTD according to the environment. The maximum RTD can be the amount of allowed time to receive and respond to a message and not cause issues at the AP.

The time alignment is critical for correct decoding of concurrent Physical-layer Protocol Data Unit(s) (PPDU) at the AP. If the inter-PPDU maximum delay reaches the cyclic prefix size, the Inter-Symbols Interference (ISI) will be dominant, which can result in data loss.

A set of APs can form a multi-AP system. There can be at least two types of multi-AP systems: a coordinated system and a joint system. The coordinated systems can send and/or receive each portion of data by a single AP. The joint system can send and/or receive data by multiple APs. Some of the coordination possible in the multi-AP systems can include Coordinated OFDMA (Co-OFDMA), null steering, and/or joint transmission and reception.

Most of the above techniques, e.g. null steering, can require the channel state information of clients (e.g., desired/intended and undesired clients) be sent to all APs, which has made the sounding procedure very challenging. Thus, there is a need to find other procedures to enable the Multi-AP efforts. Enabling coordinated uplink transmissions is particularly important to prevent interference that could occur and affect service quality.

In the multi-AP coordination, the coverage area (e.g., the cell size) of each AP is large to effectively leverage the advantages of coordination. However, the current design of coordinated APs does not provide the benefit for the TB-UL scheme because of several reasons. The Media Access Control (MAC) scheduler's preference is to select STAs physically near to the AP to keep the ISI at minimum because of round-trip delay issue. Also, the Trigger frame may take the channel of the entire group of joint APs while the intention is to only trigger the STAs nearby. Further, sounding may be required for finding the channels to desired clients and clients that may need null signals. Therefore, there is a need to keep the functionality of the TB-UL while keeping the advantage of multi-AP coordination.

The aspects herein can provide for an antenna beam switching mechanism to better support Extremely High Throughput (EHT) TB-UL while providing efficient multi-AP coordination. Using a switchable antenna, a dual mode of an antenna beam can be used for normal coordinated Multi-AP phases and EHT TB UL. These two antenna modes can include a wide beam and a narrow(er) beam. The wider antenna beam can be used for the normal operation of multi-AP operations. In contrast, for the EHT TB UL, the narrow(er) beamwidth may be employed.

In at least some implementations, a centralized scheduler (e.g., a master AP) can coordinate the uplink transmission. During the normal mode of operation, the antenna beamwidth is wide (e.g., in an omni-directional configuration) to support multi-AP coordination capabilities, as discussed above. When uplink traffic is scheduled in all or some of the APs in the coordinated AP set, APs can switch to the micro configuration (e.g., switch to a smaller beamwidth).

Stations can be organized into groupings for the uplink transmissions. The uplink grouping may be weighted towards RU allocation that includes devices in the macro-cell. This arrangement can be the default to avoid large delay spreads in the window of the received trigger-based UL(s) across all the devices. During uplink scenarios, the trigger frames can be sent to the desired clients inside the micro coverage area. If joint Physical layer (PHY) reception is not enabled, the antenna mode may be the same for uplink frames too. In this scenario, the inter-AP interference can be reduced. With this solution, the multi-AP coordination can be used with lower overhead for the purpose of uplink multiuser transmissions. In an example, uplink frames can be sent with no joint reception. The antenna configuration is unchanged for the entire EHT TB UL sequence.

The aspects herein can include grouping of clients. For uplink multi-user transmissions, the AP can have a group of clients, in closer physical proximity, to minimize the effect of round trip delay between nearest and furthest clients. Therefore, the uplink grouping is weighted towards RU allocation that includes devices in the macro-cell. Scheduling of clients can better support the method as follows. First, the Received Signal Strength Indicator (RSSI) of clients in normal/macro operation can be collected. Then, the RSSI of received uplink packets can be collected in the micro/narrow beam configuration, which can be done by transmitting trigger frame(s) to single client(s). Then, the AP can compare the RSSIs to determine the possibility of scheduling the client with the proposed UL method. For example, if the maximum difference, in RSSIs, is larger than a predefined maximum number, the client cannot be part of the proposed uplink. Further, if the client is on the edge of macro coverage area, then there is a high probability that that client will not receive the trigger frame in micro mode, and the client should not be added to the UL group.

As mentioned, the beamwidth/directivity of some antennae is controllable. Therefore, the AP can determine a best beamwidth for these controllable antennae. The antenna beamwidth can be selected based on one or more criteria, which can include, but is not limited to, the maximum tolerable RTD, and/or the overlap between two micro areas from two APs. The aspects herein can include a calibration mechanism for the APs to satisfy these criteria.

The calibration method can include a calculation of the maximum beamwidth that covers only the radius less than the max RTD. Then, the AP can set the beamwidth of the AP to the calculated RTD maximum value from 1. The AP may then transmit trigger frame(s) to only one AP. For the two or more clients that have been selected for the uplink group of the AP, it does not matter if this trigger is being sent by a narrow or a wider beam. Then, the coordinated APs can set the antenna of other APs (in coordination) in the narrow/micro beam. If the uplink packets are received at any other AP in the coordinated group, the AP(s) can reduce the beamwidth of the antenna and repeat the procedure above.

Otherwise, if no uplink packet is received after the trigger event, the coordinated AP(s) can repeat the process for the other APs.

It should be noted that this calibration does not need to be done frequently, and the intervals are not similar to Channel State Information (CSI)/sounding. Thus, the aspects herein provide a system that is drastically more stable than MU-MIMO-type transmissions.

Figure 1:
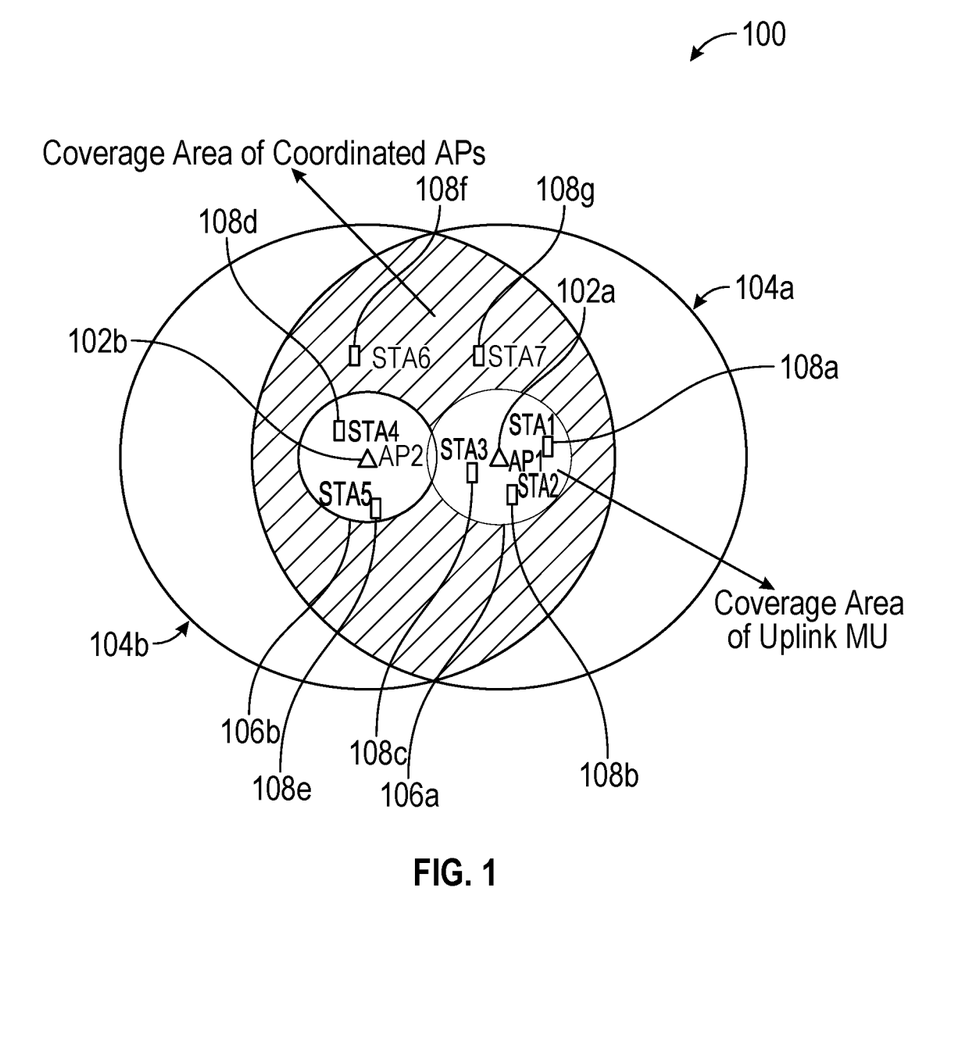
FIG. 1 is a block diagram of wireless network environment in accordance with aspects of the present disclosure.

A wireless environment 100 may be as shown in FIG. 1. The wireless environment 100 can include a wireless local area network (WLAN), which may be referred to as WLAN 100, which can include two or more nodes, e.g., APs 102a and 102b. The wireless environment 100 shows just two APs 102, but the wireless environment 100 can include two or more APs 102. APs 102 can function in a multi-AP coordination environment. Therefore, the APs 102 can communicate with each other to conduct operations in concert.

The APs 102 may be in communication with one or more client stations 108a-108g, which may also be referred to simply as clients 108 or simply as stations 108. The stations 108 may be physically dispersed through a physical area covered by APs 102 of the WLAN 100. The stations 108 and the APs 102 may be wireless devices, as described in conjunction with FIG. 6B and may be computing systems, as described in conjunction with FIG. 6A. The network 100 can be controlled by a controller (not shown), e.g., a WLC, a network controller, etc. The controller may be a computer system, wireless device, and/or another device, as described in conjunction with FIGS. 6A and 6B.

As stated above and as shown in FIG. 1A, the wireless network 100 may comprise Wi-Fi APs 102 (e.g., first AP 102a and/or second AP 102b) that may be configured to support a wireless (e.g., Wi-Fi) network 100. The APs 102 may comprise a physical location where a user, operating a client station 108, may obtain access to a wireless network 100 (e.g., Internet access), using Wi-Fi technology, via a WLAN using a router connected to a service provider.

In another example(s) of the disclosure, rather than APs 102, devices may be used that may be connected to a cellular network that may communicate directly and wirelessly with end use devices (e.g., a client station 108 device) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, example of the disclosure may use wireless communication protocols using, for example, Wi-Fi technologies, cellular networks, or any other type of wireless communications.

Client station devices 108 may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

The elements described above of the wireless network 100 (e.g., WLC, first AP 102a, second AP 102b, client devices 108a-108g, etc.) may be practiced in hardware, in software (including firmware, resident software, microcode, etc.), in a combination of hardware and software, or in any other circuits or systems. The elements of wireless network 100 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIGS. 6A and 6B, the elements of wireless network 100 may be practiced in a computing device 600 and/or wireless device 630.

Figure 3A:
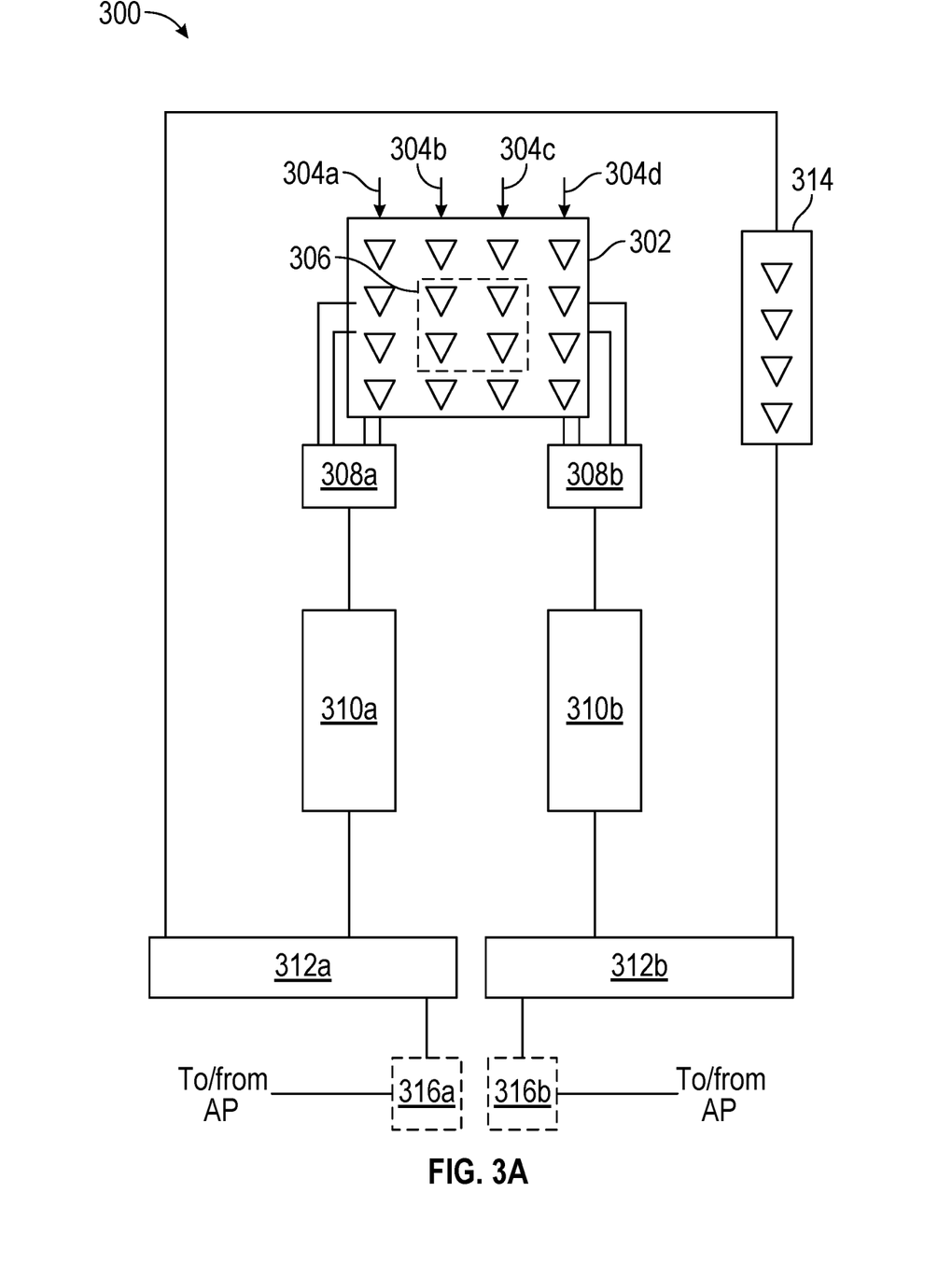
FIG. 3A is a block diagram of a wireless device antenna array system in accordance with aspects of the present disclosure.
Figure 3B:
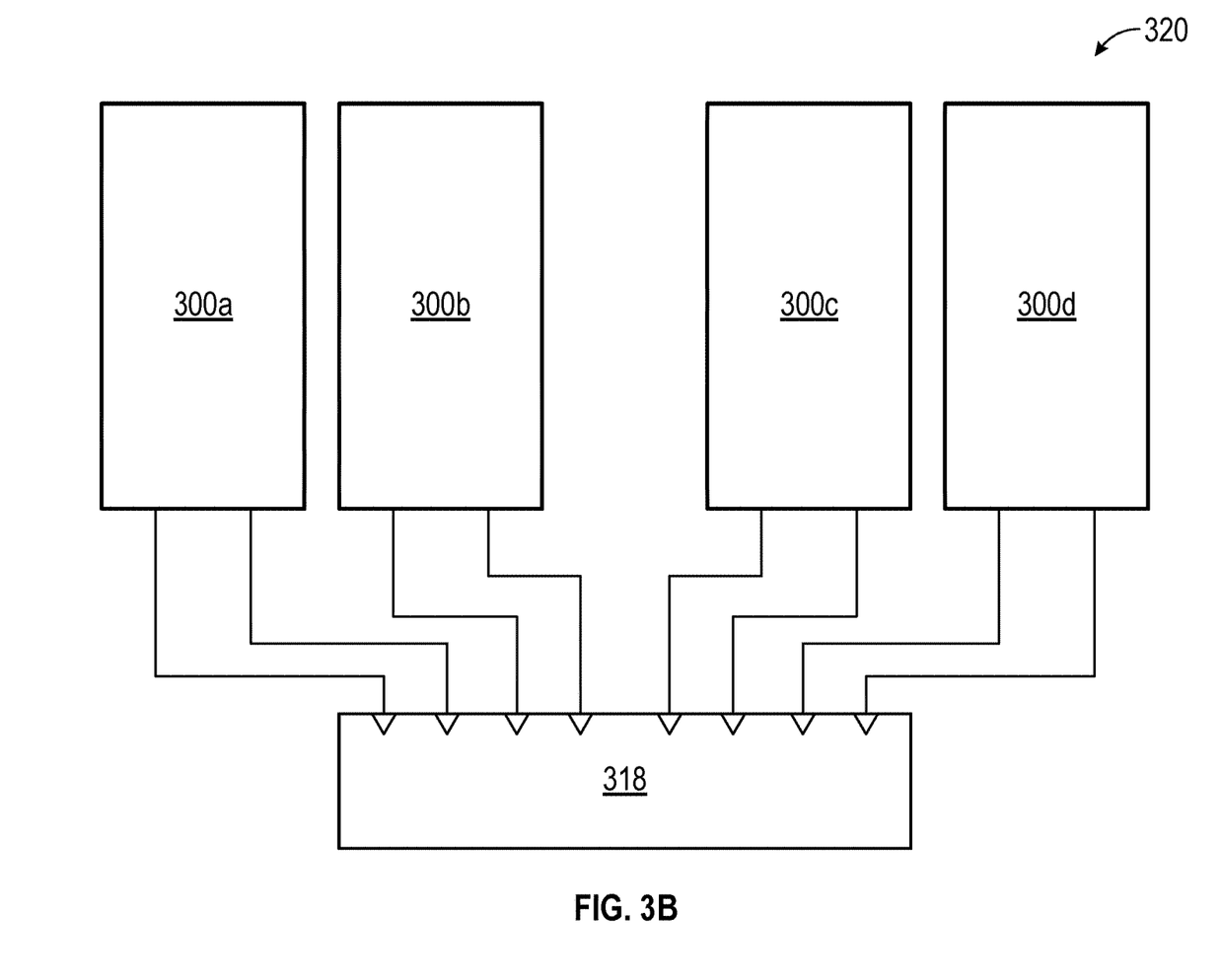
FIG. 3B is another block diagram of a wireless device antenna array system in accordance with aspects of the present disclosure.

The APs 102 may function with an antenna system, as described in conjunction FIGS. 3A and 3B. The antenna system may be operable to electronically control the beam or the coverage area 106 (also referred to as a micro-cell) of the AP 102. For example, AP1 102a can have a narrow(er) beam, which covers an area 106a. Likewise, AP2 102b can have a narrow(er) beam coverage area 106b. However, both APs 102a, 102b may have larger widebeam coverage areas 104a, 104b (also referred to as a macro-cell). The AP(s) 102 can selectively change the coverage area 104, 106, depending on the conditions or the types of operations being conducted by the APs 102.

The area between or covered by both coverage areas 104a, 104b may be a coverage area for coordinated AP operations. The multi-AP coordination area includes the stations 108a-108g. Thus, various operations may be coordinated between the two APs 102a, 102b for these several stations 108. However, in some situations, the APs 102 may only use the narrow beam with coverage area 106, for example, during uplink of multiple clients 108.

Figure 2:
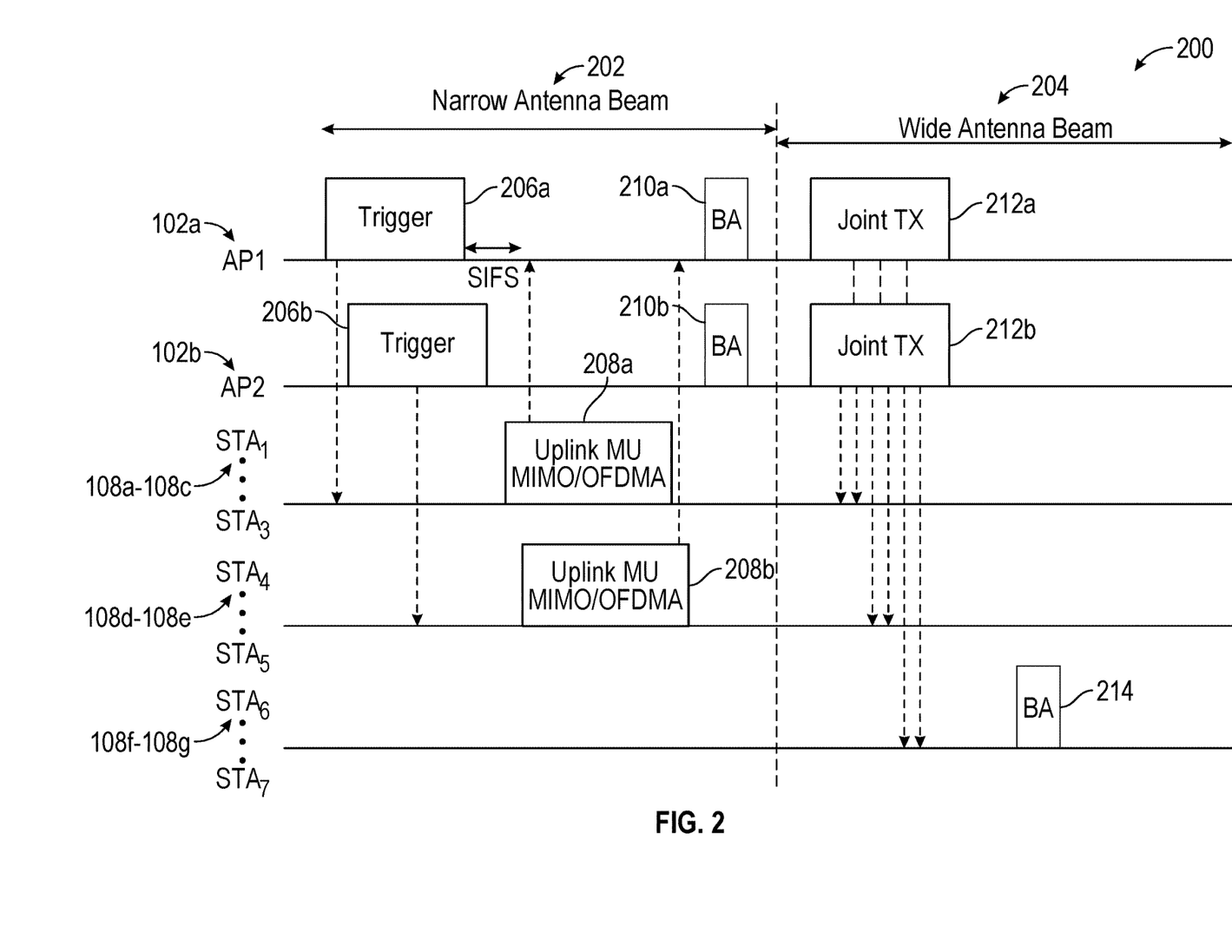
FIG. 2 is a signaling diagram or signpost diagram of signaling in the wireless network environment in accordance with aspects of the present disclosure.

An embodiment of a signaling process 200 may be as shown in FIG. 2. Signaling process 200 can include both an uplink operation 202 and a downlink operation 204. In multi-AP coordination, the uplink data transmission may cause interference between multiple APs 102 if the station is in the coverage area 104 of both APs 102. Therefore, each AP 102 may use a narrow antenna beam during the uplink process 202, as shown in FIG. 2. Thus, the APs 102 may use the smaller coverage area 106 during uplink operations.

During uplink, AP1 102a may send the trigger frame 206a to the stations 108a through 108c, within in the narrow beam with coverage area 106a. Likewise, stations 108d-108e are in temporal proximity to AP2 102b, which can send the trigger frame 206b in the narrow coverage area 106b to stations 108d-108e. The different stations 108 may receive the trigger frames 206 and send uplink MU MIMO/OFDMA RUs 208a, 208b. The one or more APs 102 may respond to the RUs 208 with the block acknowledgments (BA) 210a, 210b. In this way, the uplink occurs with the narrow beam at the APs 102 which prevents interference at stations 108 close to the other AP 102.

In contrast to the uplink operations 202, other multi-AP coordination efforts, for example, joint DL transmission of information or other operations, as described herein, may occur with a wide antenna beam, in operations 204. During operation 204, the APs 102 may use a wide coverage area 104a, 104b. During this multi-AP coordination operation, the APs 102a, 102b may send joint transmissions 212a, 212b to the various stations 108. The stations 108 can respond with BAs 214. Thus, unlike uplink transmissions in operation 202, other multi-AP coordination efforts, in operations 204, may occur jointly and not cause interference, which may happen during uplink operations.

An example AP 102, with an antenna array, may be as shown in FIGS. 3A and 3B. The AP 102 can include a processing component and a radio component. The radio component 300 can have one or more antennas 304a-304d. Each AP 102 may include more than one radio component(s) 302a through 316b.

FIG. 3A illustrates an example implementation of a component layout for an example antenna segment 300, according to example(s) of the present disclosure. Each antenna segment 300 is configured to operate a narrow-beam antenna array 302 and/or a wide-beam antenna array 314 (at a given time). The narrow-beam antenna array 302 provides an N×N array of antenna elements, whereas the wide-beam antenna array 314 provides a 1×M array of antenna elements. It should be noted that, in some configurations, wide-beam antenna array 314 may be a part of the elements forming the narrow-beam antenna array 302. The number of elements (e.g., the individual signaling elements making up the antenna arrays) in an array determines the beamwidth in azimuth and elevation. The layout of the narrow-beam patch 302 can, in some implementations, provide an (N−2)×(N−2) subset of inner antenna elements 306, which are surrounded by a subset of outer antenna elements (i.e., those antenna elements included in the narrow-beam antenna array 302 that are not neighbored by at least four antennas).

The narrow-beam antenna array 302 and the wide-beam antenna array 314 can be dual polarized antenna arrays. By being dual polarized, two different radio paths can use the same array at the same time. One path is connected to a vertical polarization feed, while the other is connected to a horizontal polarization feed, essentially providing two antenna arrays with one set of elements.

Signals are routed to/from the narrow-beam antenna array 302 or the wide-beam antenna array 314 via a switching pathway. The switching pathway includes several switches 310a-b and 312a-b that route signals to/from the activated antenna array. Base switches 312a-b determine whether the signals are routed to/from the narrow-beam array 302 or the wide-beam antenna array 314, whereas intermediary switches 310a-b route the signals to/from the phase shifters 308a-b connected to the narrow-beam antenna array 302. Although illustrated with one arrangement of switching components, it will be appreciated that various other arrangements of switching components (including cascaded 2:1 switches) can be used to link the antenna arrays to various signaling sources.

The low side lobes formed through aggressively tapering the narrow beam prevent APs 102 in the same frequencies from detecting one another's transmissions, even when mounted in close proximity to one another (e.g., within 50 feet). In some implementations, the side lobes have an amplitude of −30 dB relative to the main lobes of the narrow beam. In various examples, unequal power dividers and attenuators are used to provide lower powered signals to the outer antenna elements of the narrow-beam antenna array 302 than the inner antenna elements, thereby reducing the power of the side lobes relative to a main lobe. Due to the control of the side lobe amplitude, the antenna segment 300 (and any antenna array including the antenna segment 300) can omit band-pass filters 316a-b that are typically used to increase isolation between co-located radios within an AP 102, although in some examples, the band-pass filters can be retained to increase co-located radio isolation.

A pair of phase shifters 308a-b is connected to each feed of the dual-polarized narrow-beam antenna array 302, which allows for each polarization of the beam to be steered. These positions can include a neutral position, where no steering is applied, a positive offset from the neutral position in a first direction, and a negative offset from the neutral position in a second direction opposite to the first direction. In various implementations, the phase shifters 308a-b are Butler matrices, but other switched phase feed networks can be used as phase shifters 308a-b to steer the beams in discrete increments while maintaining minimal side lobes. The first phase shifter 308a steers the first beam for the vertical polarization by phase shifting the first signal across columns of the narrow-beam antenna array 302, and wherein the second phase shifter 308b steers the first beam for the horizontal polarization by phase shifting the second signal across columns of the narrow-beam antenna array 302.

In various examples, the phase shifters 308a-b steer the narrow beam by creating relative phase differences in the columns of the narrow-beam array 302. For example, when steering to a positive offset, if the first column 304a has a phase of A, the second column 304b would have a phase of A+B where B is a fixed phase difference determined to create the desired degrees of steering. The third column 304c would have a phase of A+(2*B), and the fourth column 304d would have a phase of A+(3*B). To steer to a negative offset, if the first column 304a has a phase of A, the second column 304b would have a phase of A−B where B a fixed phase difference determined to create the desired degrees of steering. The third column 304c would have a phase of A−(2*B), and the fourth column 304d would have a phase of A−(3*B). To remain at the neutral or zero-offset position, the phases across the columns 304a-d are all equal. In some implementations, the APs 102 can steer the narrow beams to ensure the coverage areas 106 do not overlap or cause interference at one or more STAs 108.

The wide-beam antenna array 314 produces a fixed position beam (e.g., the beam covering coverage area 104 discussed in FIG. 1), whereas the narrow-beam antenna array 302 produces an electronically steerable beam (e.g., the beam to focus on the coverage area 106 discussed in FIG. 1). The narrow-beam antenna array 302 produces a beam of a first beamwidth, which is less than the beamwidth of the beam produced by the widebeam antenna array 314. In various examples, the beamwidth of the beam produced by the wide-beam antenna array 314 includes or encompasses all of the coverage ranges of the beam produced by the narrow-beam antenna array 302 steered to any of the potential positions thereof.

FIG. 3B illustrates a component layout for an antenna array 320, according to examples of the present disclosure. The antenna array 320 includes four instances of an antenna segment 300a-d, as described in relation to FIG. 3A, and an interface 318 acting as a signal source for signals to transmit via the antenna segments 300a-d, and may be used as a steerable and switchable antenna array for various APs 102. In various examples, two or more radios are connected to the antenna segments 300a-d (and/or alternative antennas) via the interface 318.

In various examples, additional alternative antennas can also be connected (via one or more switches) to various ports of the interface 318 to allow for different frequencies, communication standards, or beam patterns to be used in the antenna array 320. For example, the antenna segments 300a-d can operate in a first frequency bandwidth (e.g., 5 GHz) from all of the radios sending signals via the ports of the interface 318 (e.g., ports ABCD and EFGH), but additional antennas (not illustrated) connected to a subset of the ports (e.g., ports EGHG) can operate in a second frequency bandwidth (e.g., 2.4 GHz).

Using four instances of the antenna array 320, an AP 102 is configured to operate in a dual 4×4 MIMO mode with no mutual interference between radios. Accordingly, due to the beam shaping and tapering provided by the individual antenna segments 300a-d (e.g., precise antenna pattern with low side lobe levels), the antenna array 320 allows for high-channel reuse in high-density applications where several APs 102 are deployed with corresponding instances of the antenna array 320. Switchable beam directions allow flexibility in aligning cells in the same or adjoining coverage areas 104/106 for the different APs 102 so that several APs 102 can be grouped closely together (e.g., within 50 feet of one another).

Figure 3C:
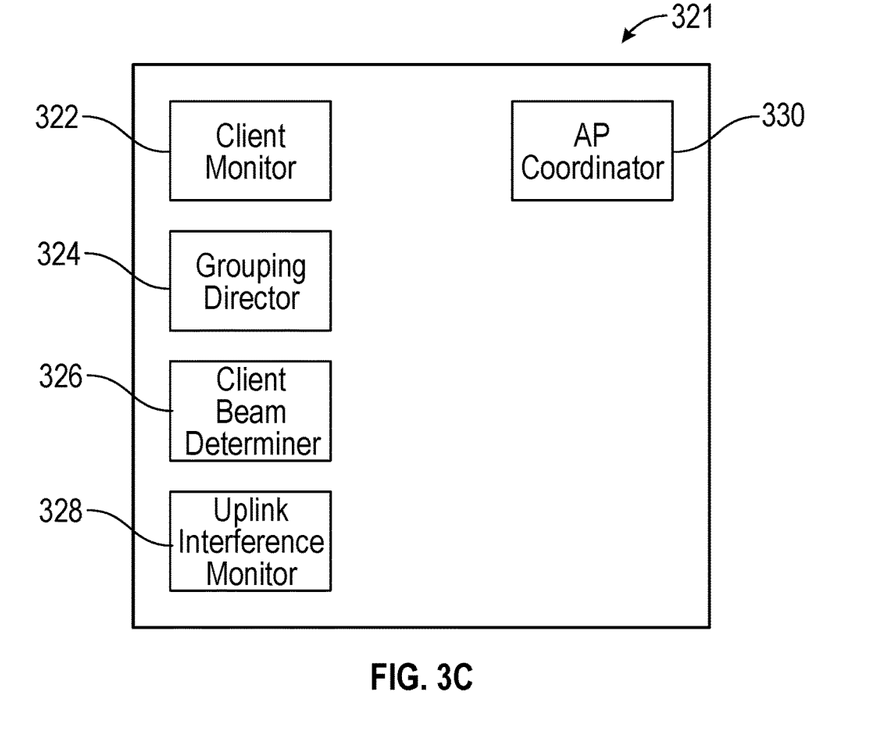
FIG. 3C is a block diagram of an AP or other network node device in accordance with aspects of the present disclosure.
Figure 6A:
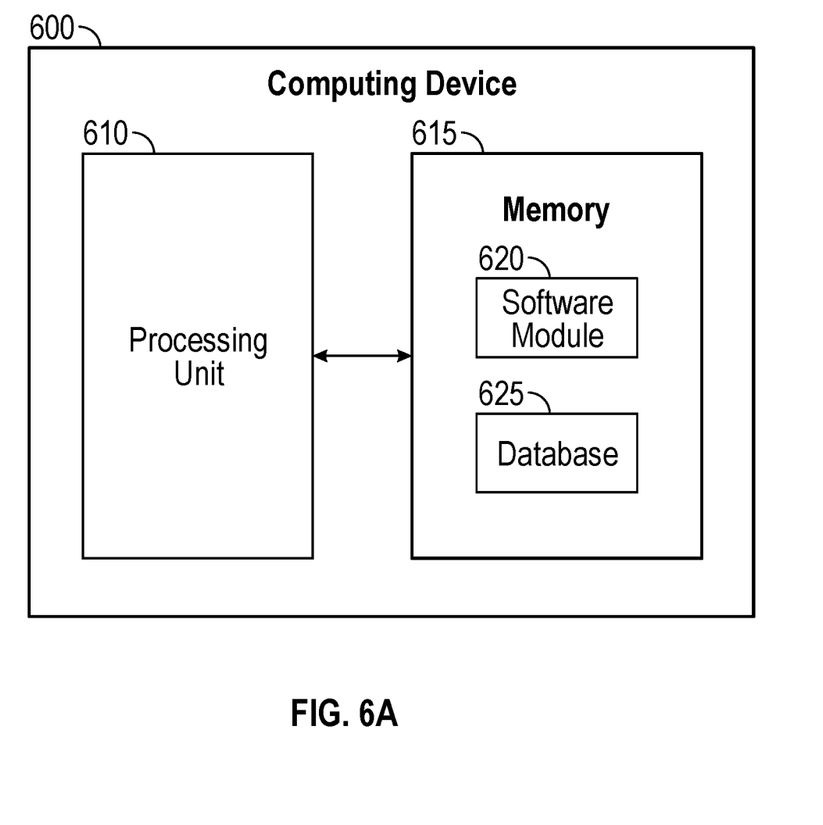
FIG. 6A is a block diagram of a computing device in accordance with aspects of the present disclosure.

An embodiment of one or more components, associated with the APs 102, may be as shown in FIG. 3C. The APs 102 can include components 321, which may be part of or executed as part of the computing system 600 as is shown in FIG. 6A. These components 321 can include one or more of, but are not limited to, a client monitor 322, a grouping director 324, a client beam determiner 326, an uplink interference monitor 328, and/or an AP coordinator 330.

The client monitor 322 can monitor the one or more stations 108. The monitoring can determine the RSSI of the uplink signals from each of the client stations 108. Further, other measures may be monitored for the stations 108, including the Quality Of Service (QOS) indicators, data loss, client station location(s), and other metrics and measures of the service being provided to the client stations 108. This data may then be provided to the other components 324-330.

A grouping director 324 may determine which client stations 108 may be part of the group to conduct uplink within the narrow beam coverage area 106. Thus, the grouping director 324 can determine locations for client stations 108. Further, the grouping director 324 may decide or indicate whether those stations 108 are capable of providing or conducting uplink transmissions, as provided in FIG. 2. Based on the information provided about clients 108 in a group, the grouping director 324 can store data structures, indicating which clients 108 are currently within the narrow beam coverage area 106, may conduct uplink operations 202, as shown in FIG. 2, and store the data structure in the memory 515 of the AP 102.

The grouping director 324 and client monitor 322 may provide data to the client beam determiner 326. The client beam determiner 326 can change the coverage area 104/106 by manipulating the beamwidth of the antenna, as described in conjunction with FIGS. 3A and 3B. Thus, the coverage area 106, as is shown in FIG. 1, may only be exemplary and may be larger or smaller or may be steered in one or more planes depending on the operation of the antenna and the needs of the uplink operation. The client beam determiner 326 can then modify this size of the coverage area 106 in relation to the client stations 108 and those stations 108 being serviced by the other AP 102b that is in multi-AP coordination. Thus, the second AP 102b may send information to the first AP 102a for the client beam determiner 326 to determine if the coverage area 106a is causing interference problems with the second AP 102b. In other implementations, the stations 108 being serviced by the second AP 102b, e.g., station 108d and station 108e, may also be sending signals to the AP 102a for the client beam determiner 326 to determine if there is any interference. Based on these different measures, the client beam determiner 326 can determine the current coverage area 106a and may manipulate that coverage area 106a over a period of time. When the environment changes, the client beam determiner 326 can also change the coverage area 106, based on the current needs of the coverage area 106 and the client stations 108.

The uplink interference monitor 328 can monitor issues with uplink signals from the stations 108. The interference can manifest as changes in the RSSI, QOS indicators, or other information. Based on this information, the uplink interference monitor 328 may provide that information back to client monitor 322. The changes to or detection of interference can also be communicated to the AP2 102b. Thus, if the two APs 102a, 102b are in multi-AP coordination, the uplink interference monitor 328 may indicate to the other AP 102b that the AP's operations are causing interference with AP 102a uplinks. This information or signal from the uplink interference monitor 328 can trigger changes to operation with a narrow antenna beam operation 202, or into changes of the coverage areas 106.

The AP coordinator 330 can coordinate with the other APs 102. For example, the AP coordinator 330, of the first AP 102a, can receive information from the second AP 102b as to whether there is interference with the other APs' signals. The AP coordinator 330 can conduct the other multiple multi-AP coordination operations, as described previously. Any communication or coordination between APs 102 may be conducted by the AP coordinator 330.

Figure 4:
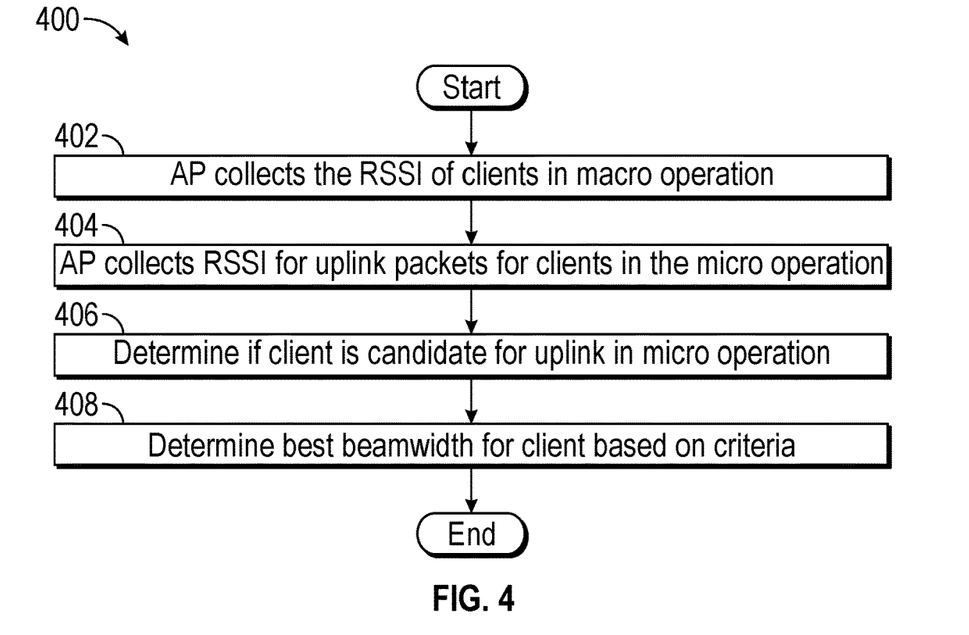
FIG. 4 is a flow chart of a method for determining a beamwidth for transmission of data to an AP in accordance with aspects of the present disclosure.

Referring now to method 400 of FIG. 4, the method 400 can provide a method for grouping or determining which clients should be provided with what type of service by the AP 102, in accordance with aspects of the disclosure. The method 400 can start with a start operation and can end with an end operation. The method 400 can include more or fewer steps or can arrange the order of the steps differently than those shown in FIG. 4. The method 400 can be executed as a set of computer-executable instructions, executed by a computer system or processing component, and be encoded or stored on a storage medium. Further, the method 400 can be executed by a gate or other hardware device or component in an ASIC, a FPGA, a SOC, or other type of hardware device. Hereinafter, the method 400 shall be explained with reference to the systems, components, modules, software, data structures, etc. described herein.

AP 102 can collect the RSSIs of clients 108 in a first macro operation, in stage 402. The AP 102 can collect RSSI information from one or more stations 108, in the wide coverage area 104. The RSSI from the client stations 108 can determine the physical proximity of the stations 108 to the AP 102. For example, a first station 108a, with better RSSI and other indicators, may be determined to be closer to the AP 102a then STA 6 108f that has RSSI information that indicates a further physical separation from the AP 102. This RSSI may be collected by a client monitor 322 at the AP 102.

The AP 102 may then collect the RSSI for uplink packets for clients 108, in a micro operation, in stage 404. The client monitor 322 may collect RSSI, when the AP 102 changes to a narrow beam, to receive uplink transmissions from stations 108, in coverage area 106. The client monitor 322 may determine the RSSI for different clients 108 and to determine or better determine which stations 108 are within the coverage area 106 of the narrow beam of the AP 102. The steps or stages 402/404 may be iterative and repeated periodically (e.g., every second, every minute, etc.) as the AP 102 can change from the wide coverage area 104 to the narrow coverage area 106. The coverage area 106 may expand or contract depending on the information received by the client monitor 322 and reported to the client beam determiner 326.

The AP 102 may then determine if the client 108 is a candidate for the narrow beam uplink, in a micro operation 202, in stage 406. The client monitor 322 may provide the information about the RSSI or other measures to the grouping director 324. The grouping director 324 can select one or more clients 108 that may be candidates for providing uplink data, in the micro operation 202, in the narrow beam coverage area 106. In an implementation, the RSSI from the wide beamwidth transmission can be compared to the RSSI from the narrow beamwidth transmission. If the difference between these two RSSIs crosses a predetermined threshold (e.g., less than 20% difference), the client can be determined to be a candidate for the narrow beamwidth operations.

There may be a limitation on the number of clients 108 able to or allowed to provide uplink information, in the micro operation 202. For example, the AP 102 may only be capable of handling or managing four client stations 108 during uplink operations 202. As such, only four stations 108 may be chosen by the grouping director 324 to service during micro operations 202. The station information, for example, an identifier for station (e.g., a numeric identifier, an alphanumeric identifier, a Globally Unique Identifier (GUID), a MAC address, a Uniform Resource Locator (URL), etc.), or other types of information may be stored in a data structure to identify the station 108, as part of the micro operation group. This station information may then be provided to the client beam determiner 326.

The AP 102 can then determine the best beamwidth for the clients 108 to be used in the micro operations 202, based on one or more predetermined criteria, in stage 408. The client beam determiner 326 can determine the coverage area 106 of the narrow beam. The narrow beam can change the coverage area 106. The criteria used to determine the size of the coverage area 106 may include, for example, one or more of, but is not limited to, the RSSI of each station 108, the position or location of the stations 108, the location of the other APs 102b in the multi-AP coordination group, the location of the stations 108 being serviced by the other AP 102b, the locations of stations that may be outside the coverage area 106 or not communicated to in the micro operation 202, the RTDs of the stations 108, or other types of measures. This information may be used to determine the best beamwidth for using for uplink with the stations 108 without causing interference to other stations 108.

Figure 5:
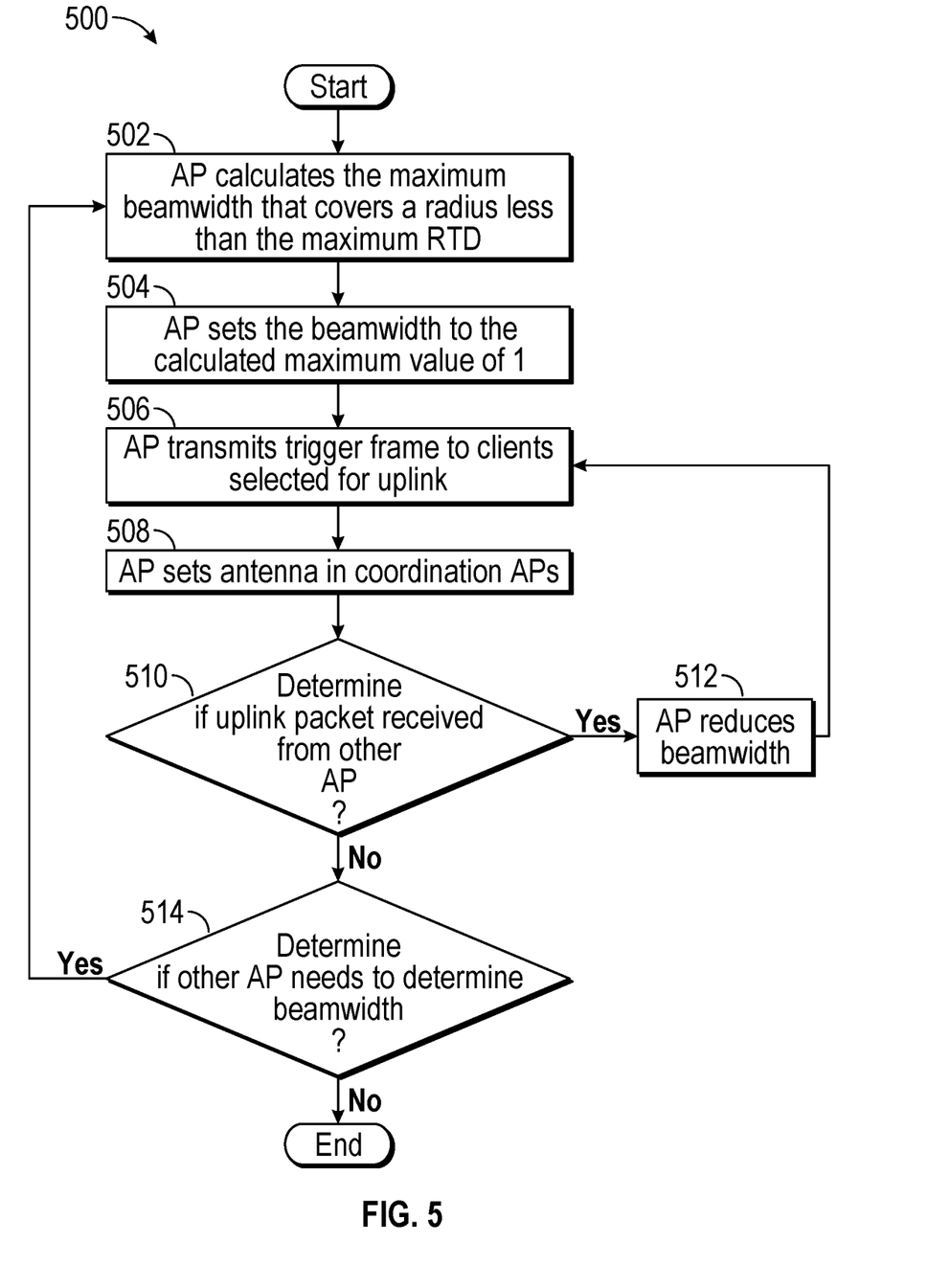
FIG. 5 is another flow chart of a method for determining a beamwidth for transmission of data to an AP in accordance with aspects of the present disclosure.

An embodiment of a method 500 for determining the coverage area 106, of the narrow beam antenna, may be as shown in FIG. 5 in accordance with aspects of the disclosure. The method 500 can start with a start operation and can end with an end operation. The method 500 can include more or fewer steps or can arrange the order of the steps differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, a SOC, or other type of hardware device. Hereinafter, the method 500 shall be explained with reference to the systems, components, modules, software, data structures, etc. described herein.

The AP 102 can calculate the maximum beam, which the covers a radius less than the maximum RTD for one or more APs 102, in stage 502. The client monitor 322 can monitor the RSSI and the timing of packets being sent to and/or from the stations 108. The client monitor 302 can calculate the maximum RTD and other information to determine locations of the stations 108, from the signal strength. This information may be sent to the client beam determiner 326. From this information, the client beam determiner 326 can determine the maximum radius of the coverage area 106 that covers the stations 108, but also is less than what is required for the maximum RTD to allow for proper uplink transmission.

The AP 102 can then set the beamwidth of the antenna 300 to the calculated maximum value of one, in stage 504. The client beam determiner 326 can set the beamwidth to this calculated maximum and then set that value as one. In this way, the client beam determiner 326 can modify the coverage 106 up or down by changing the set value from one.

The AP 102 can then transmit the trigger frame 206, to the client 108 that is selected for uplink, in stage 506. Here, the trigger frame 206 may be sent by the RF portion of the AP 102, as described in conjunction with FIG. 6B, to the different client stations 108. The client stations 108 include those clients, e.g., clients 108a-108c, within the coverage area, e.g., coverage area 106a, that have been selected for uplink. The trigger frame 206 is sent to the one or more stations 108 to determine or receive uplink transmissions, e.g., uplink MU MIMO/OFDMA RUs 208. The APs 102 may communicate to determine if the other AP 102 or clients serviced by the other AP 102 receives the trigger frame 206 or other data. This information may be sent to the beam determiner 326.

The AP 102 then sets the antenna beamwidth, in coordination with the other APs 102, in stage 508. The AP coordinator 330, of a first AP 102a, can send signal information, e.g., antenna state, client RSSI information, etc., to the second AP 102b to set the antenna for receiving uplink transmissions. Further, the AP coordinator 330, of the AP 102a, can also receive similar signal information from the other AP 102b. In this way, the antenna is set to an antenna beamwidth that covers coverage area 106 that should not interfere with the second AP 102b. Further, the direction of reception for the antenna or other types of parameters, for example, transmit power, may be also set based on coordination with the other AP 102, as conducted by the AP coordinator 330.

The AP 102a can determine if an uplink packet is received from the other AP 102b, in stage 510. The uplink interference monitor 328 can measure or detect packets that may be received from the other AP 102b. For example, the uplink interference monitor 328 can scan for and/or detect the trigger frame 206 (or other signals or packets) that may be sent from the second AP 102b or clients in coverage area 106b. Other packets that may be sent and detected from the other AP 102b can include the BAs 210b, transmissions 212b, or other types of packets or signals. If an uplink packet is received from the other AP 102b, or clients 108d-108e, the method 500 proceeds "YES" to stage 512. However, if no packet is received from the other AP 102b, or clients 108d-108e, the method 500 proceeds "NO" to stage 514.

In stage 512, the AP 102a reduces the AP's beamwidth. The beamwidth can be adjusted by the client beam determiner 326 and the RF component. The new beamwidth information may be presented to the uplink interference monitor 328, the client monitor 322, the group director 324, etc., to repeat the stages 506-510 as described above. The interference monitoring and the adjustment of the beamwidth can be repeated to modify (e.g., shrink) the coverage area(s) 106a/106b, as needed.

In stage 514, the AP 102a determines if the other AP 102b needs to determine a new beamwidth. The interference monitor 328 may send information about interference from AP 102b to the AP coordinator 330. If there is interference from the other AP 102b, the interference information may be sent to the other AP 102b through the AP coordinator 330. If there is interference and the other AP 102b needs to determine its beamwidth, the method proceeds "YES" back to stage 502. If the other AP 102b does not need to re-determine a new beamwidth, the method 500 proceeds "NO" to an end operation.

FIG. 6A shows computing device 600. As shown in FIG. 6A, computing device 600 may include a processing unit 610 and a memory unit 615. Memory unit 615 may include a software module 620 and a database 625. While executing on processing unit 610, software module 620 may perform, for example, processes for changing the beamwidth for some operation in Multi-AP coordination, as described above with respect to FIGS. 1-5. Computing device 600, for example, may provide an operating environment for the controller, the APs 102, the clients 108, or the other devices, however, the controller, APs 102, the clients 108, and other devices may operate in other environments and are not limited to computing device 600.

Computing device 600 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Figure 6B:
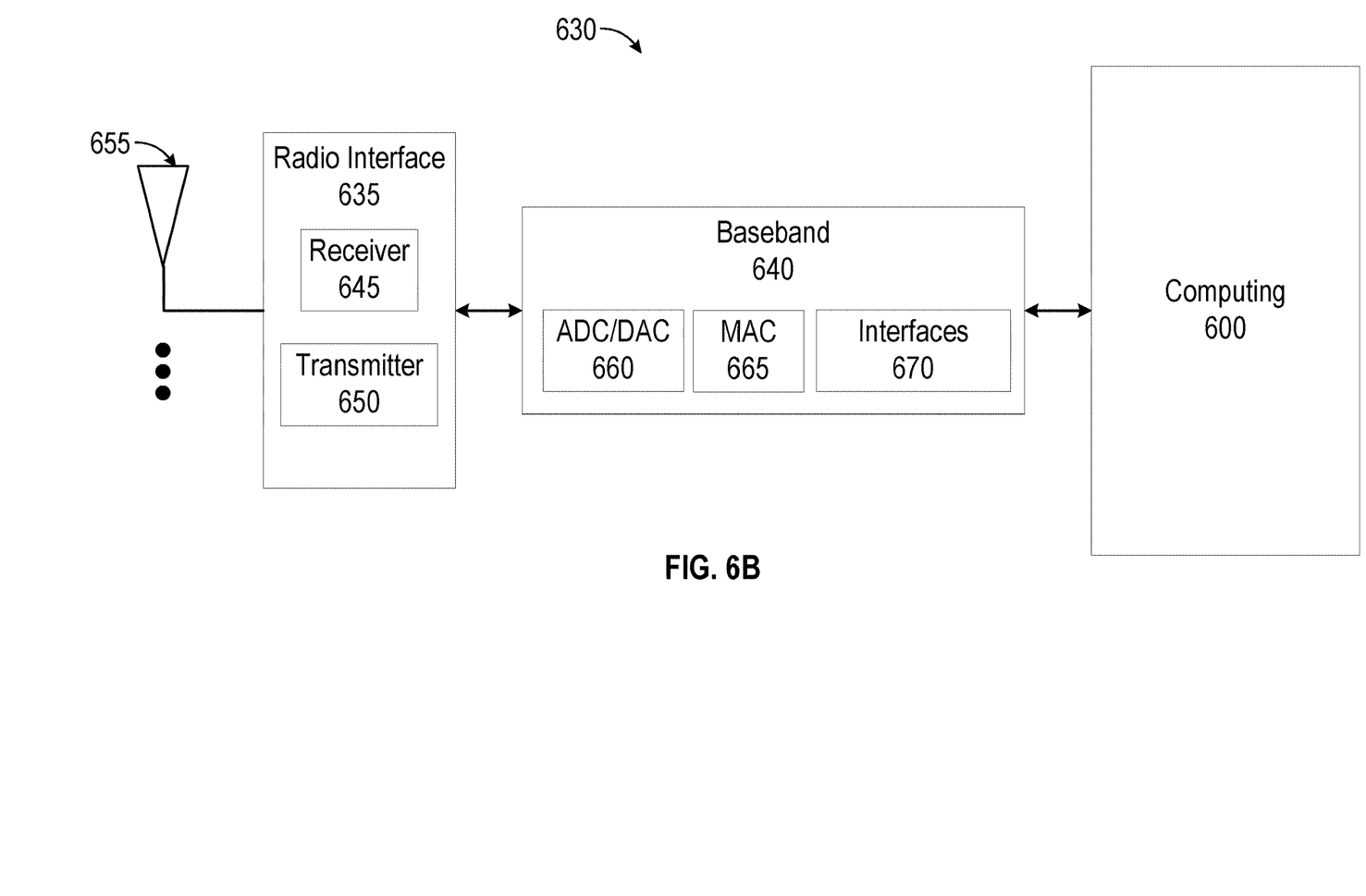
FIG. 6B is a block diagram of an AP or other networking device in accordance with aspects of the present disclosure.

FIG. 6B illustrates an embodiment of a communications device 630 that may implement one or more of APs 102, the clients 108, controllers, etc., of FIGS. 1-5. In various embodiments, device 630 may comprise a logic circuit. The logic circuit may include physical circuits to perform operations described for one or more of APs 102, the clients 108, controllers, etc., of FIGS. 1-5, for example. As shown in FIG. 6B, device 630 may include one or more of, but is not limited to, a radio interface 635, baseband circuitry 640, and/or computing platform 600.

The device 630 may implement some or all of the structures and/or operations for APs 102, the clients 108, controllers, etc., of FIGS. 1-5, storage medium, and logic circuit in a single computing entity, such as entirely within a single device. Alternatively, the device 630 may distribute portions of the structure and/or operations using a distributed system architecture, such as a client station-server architecture, a peer-to-peer architecture, a master-slave architecture, etc.

A radio interface 635, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-error interface or modulation scheme. The radio interface 635 may include, for example, a receiver 645 and/or a transmitter 650. Radio interface 635 may include bias controls, a crystal oscillator, and/or one or more antennas 655. In additional or alternative configurations, the radio interface 635 may use oscillators and/or one or more filters, as desired.

Baseband circuitry 640 may communicate with radio interface 635 to process, receive, and/or transmit signals and may include, for example, an Analog-To-Digital Converter (ADC) for down converting received signals with a Digital-To-Analog Converter (DAC) 660 for up converting signals for transmission. Further, baseband circuitry 640 may include a baseband or PHYsical layer (PHY) processing circuit for the PHY link layer processing of respective receive/transmit signals. Baseband circuitry 640 may include, for example, a Media Access Control (MAC) processing circuit 665 for MAC/data link layer processing. Baseband circuitry 640 may include a memory controller for communicating with MAC processing circuit 665 and/or a computing platform 600, for example, via one or more interfaces 670.

In some configurations, PHY processing circuit may include a frame construction and/or detection module, in combination with additional circuitry such as a buffer memory, to construct and/or deconstruct communication frames. Alternatively or in addition, MAC processing circuit 665 may share processing for certain of these functions or perform these processes independent of PHY processing circuit. In some configurations, MAC and PHY processing may be integrated into a single circuit.

The methods and systems here have distinct advantages and allow for managing uplink transmissions in a Multi-AP coordination scheme. The changing of the beamwidth eliminates at least some sounding requirements that create overhead for the APs. As such, the methods herein provide more efficient and less processing intensive ways of receiving interference-lessened uplink transmissions.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an Erasable Programmable Read-Only Memory (EPROM or Flash memory), an optical fiber, and a portable Compact Disc Read-Only Memory (CD-ROM). Node that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain example of the disclosure have been described, other example may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device 600 on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A method comprising:
   establishing Multi-Access Point (AP) coordination between at least a first AP and a second AP;
   determining an uplink operation is scheduled;
   switching a first antenna of the first AP to a first narrow beamwidth;
   receiving a first uplink transmission from at least a first client in a first coverage area of the first narrow beamwidth;
   switching the first antenna, of the first AP, to a first larger beamwidth for a next Multi-AP coordination operation; and
   determining the first client is within physical proximity of the first AP.

2. The method of claim 1, further comprising: sending a trigger frame to the first client in the first coverage area to trigger the first uplink transmission.

3. The method of claim 2, wherein the trigger frame is not received by a second client outside the first coverage area.

4. The method of claim 3, further comprising:
   switching a second antenna of the second AP to a second narrow beamwidth;
   receiving a second uplink transmission from the second client in a second coverage area of the second narrow beamwidth; and
   switching the second antenna of the second AP to a second larger beamwidth for the next Multi-AP coordination operation.

5. The method of claim 4, wherein the second coverage area and the first coverage area do not overlap.

6. The method of claim 5, wherein the first larger beamwidth and the second larger beamwidth each cover either the first client or the second client.

7. The method of claim 6, further comprising: conducting a joint downlink transmission to the first client and the second client, in Multi-AP coordination, from the first AP and the second AP with the first larger beamwidth and the second larger beamwidth.

8. The method of claim 1, further comprising: determining that the first client is within the first coverage area.

9. The method of claim 8, wherein determining that the first client is within the first coverage area comprises:
   receiving a first Received Signal Strength Indicator (RSSI) from the first client while the first antenna is configured for the first larger beamwidth for Multi-AP coordination;
   receiving a second RSSI from the first client while the first antenna is configured for the first narrow beamwidth;
   comparing a difference between the first RSSI and the second RSSI to a predetermined threshold; and
   when the difference crosses the predetermined threshold, determining that the first client is part of a group of two or more clients with which to conduct uplink operations in the first coverage area.

10. A first Access Point (AP) device comprising:
    a first antenna array;
    a memory; and
    a processing unit coupled to the memory, wherein the processing unit is operative to:
      establish Multi-AP coordination with a second AP;
      determine an uplink operation is scheduled;
      switch the first antenna array to a first narrow beamwidth;
      receive uplink transmissions, from at least a first client, in a first coverage area of the first narrow beamwidth;
      switch the first antenna array to a first larger beamwidth for a next Multi-AP coordination operation; and
      determine that the first client is within the first coverage area.

11. The first AP of claim 10, wherein the processing unit being operative to determine that the first client is within the first coverage area comprises the processing unit being operative to:
- receiving a first Received Signal Strength Indicator (RSSI) from the first client while the first antenna array is configured for the first larger beamwidth for Multi-AP coordination;
- receiving a second RSSI from the first client while the first antenna array is configured for the first narrow beamwidth;
- comparing a difference between the first RSSI and the second RSSI to a predetermined threshold; and
- when the difference crosses the predetermined threshold, determining that the first client is part of a group of two or more clients with which to conduct uplink operations in the first coverage area.

12. The first AP of claim 11, wherein the processing unit is operative to:
- receive a third RSSI from a third client while the first antenna array is configured for the first larger beamwidth for Multi-AP coordination;
- not receive a fourth RSSI from the third client while the first antenna array is configured for the first narrow beamwidth;
- compare a second difference between the third RSSI and the fourth RSSI to the predetermined threshold; and
- based on the second difference, determine that the third client is not included in the group with which to conduct uplink operations in the first coverage area.

13. The first AP of claim 12, wherein the processing unit is operative to: determine the first coverage area for the first narrow beamwidth.

14. The first AP of claim 13, wherein determining the first coverage area for the first narrow beamwidth comprises:
- determining a maximum allowed Round-Trip Delay (RTD);
- determining whether the first coverage area interferes with a second coverage area of a second antenna array of the second AP; and
- calibrating the first narrow beamwidth to have a radius that is less than the maximum allowed Round-Trip Delay (RTD) and does not interfere with the second coverage area.

15. A non-transitory computer-readable medium that stores a set of instructions which when executed perform a method executed by the set of instructions comprising:
- establishing Multi-Access Point (AP) coordination between at least a first AP and a second AP;
- determining an uplink operation is scheduled;
- switching a first antenna of the first AP to a first narrow beamwidth;
- receiving uplink transmissions from at least a first client in a first coverage area of the first narrow beamwidth;
- switching the first antenna, of the first AP, to a first larger beamwidth for a next Multi-AP coordination operation; and
- determining that the first client is within the first coverage area.

16. The non-transitory computer-readable medium of claim 15, wherein determining that the first client is within the first coverage area comprises:
- receiving a first Received Signal Strength Indicator (RSSI) from the first client while the first antenna is configured for the first larger beamwidth for Multi-AP coordination;
- receiving a second RSSI from the first client while the first antenna is configured for the first narrow beamwidth;
- comparing a difference between the first RSSI and the second RSSI to a predetermined threshold; and
- when the difference crosses the predetermined threshold, determining that the first client is part of a group of two or more clients with which to conduct uplink operations in the first coverage area.

17. The non-transitory computer-readable medium of claim 16, further comprising: determining the first coverage area for the first narrow beamwidth, wherein determining the first coverage area for the first narrow beamwidth comprises:
- determining a maximum allowed Round-Trip Delay (RTD);
- determining whether the first coverage area interferes with a second coverage area of a second antenna array of the second AP; and
- calibrating the first narrow beamwidth to have a radius that is less than the maximum allowed Round-Trip Delay (RTD) and does not interfere with the second coverage area.

18. The non-transitory computer-readable medium of claim 17, wherein determining whether the first coverage area interferes with a second coverage area of a second antenna array of the second AP comprises:
- coordinating with the second AP to put a second antenna array into a second narrow beam configuration;
- transmitting a trigger frame for the first AP;
- waiting to receive an uplink packet from a third client in communication with the second AP; and
- after not receiving the uplink packet from the third client, setting the first narrow beamwidth.

19. The non-transitory computer-readable medium of claim 15, the method further comprising: conducting a joint downlink transmission to the first client, in Multi-AP coordination, from the first AP and the second AP with the first larger beamwidth.

* * * * *